Aug. 13, 1929.
A. C. DOBRICK
1,724,697
FLARING TOOL
Filed April 14, 1927
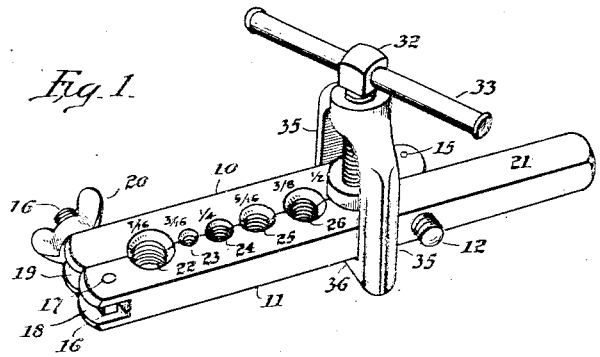
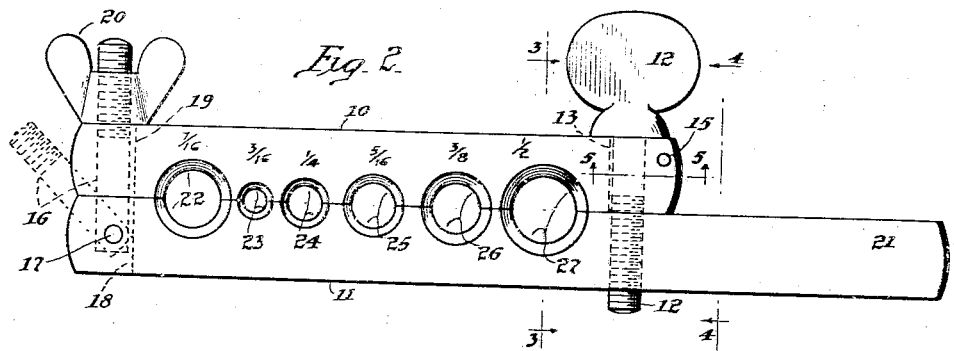
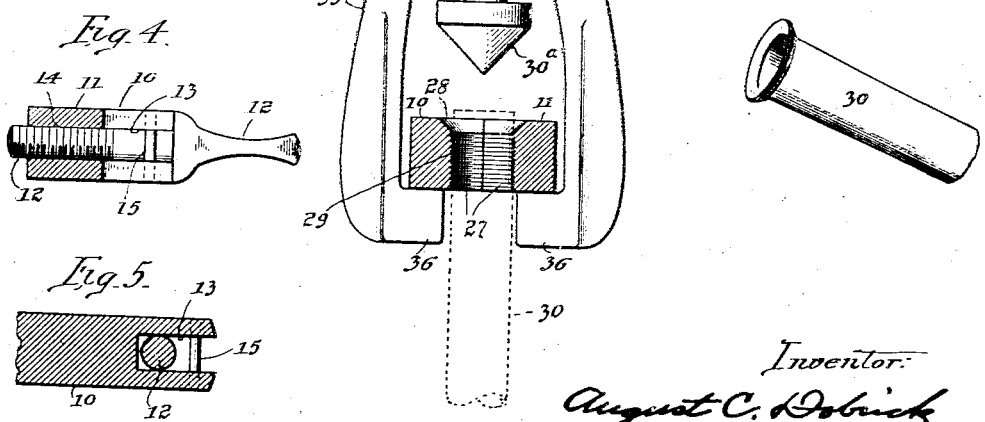
Inventor:
August C. Dobrick,
By John Howard McElroy
his Atty.

Patented Aug. 13, 1929.

1,724,697

UNITED STATES PATENT OFFICE.

AUGUST C. DOBRICK, OF CHICAGO, ILLINOIS, ASSIGNOR TO THE IMPERIAL BRASS MANUFACTURING COMPANY, OF CHICAGO, ILLINOIS, A CORPORATION OF ILLINOIS.

FLARING TOOL.

Application filed April 14, 1927. Serial No. 183,655.

My invention is concerned with apparatus for flaring the ends of tubing to make the coupling joints therefor, and is designed to produce an extremely simple and efficient device that can be conveniently employed anywhere to flare the end of a tube of any one of a number of different sizes.

To this end, it consists in a novel combination of elements, all as will be fully described hereinafter, and the novel combinations pointed out in the claims.

To illustrate my invention, I annex hereto a sheet of drawings, in which the same reference characters are used to designate identical parts in all the figures, of which,—

Fig. 1 is a perspective view of a flaring tool embodying my invention;

Fig. 2 is a top plan view of the same with the yoke removed;

Fig. 3 is a section on the line 3—3 of Fig. 2, but with the yoke in place;

Figs. 4 and 5 are sections on the lines 4—4 and 5—5, respectively, of Fig. 2; and Fig. 6 is a perspective view of an end of the tube after it has been flared.

In carrying out my invention in its preferred form, I employ a pair of clamping bars 10 and 11, which are preferably connected, as shown, by the screw 12 passed through the slot 13 formed in one end of the bar 12 and threaded into the aperture 14 in the bar 11. A pin 15 secured in the end of the bar 10 through the slot 13 prevents the complete separation of the bars at this end until the screw 12 is entirely removed, which does not occur in the ordinary use of the device. At the other end, the connection preferably consists of a link 16, the body of which is preferably rectangular in cross section, and which is pivoted by the rivet 17 in a slot 18 formed in the end of the bar 11. The rectangular portion can be swung into the recess 19 formed in the end of the bar 10 to receive the same, and the outer end of the link 16 is threaded to receive the wing nut 20 by which the bars at that end can be closely clamped together in the same manner as the screw 12 will clamp them together at the other end. The bar 11 preferably has the portion 21, which constitutes a handle, as it were, extending beyond the bar 10. Formed in the adjacent edges of the bars 10 and 11 are a series of semicircular recesses 22, 23, 24, 25, 26 and 27, these recesses each being provided with the flaring top portion 28, and the semicircular portions beneath said flaring top portion are corrugated or threaded, as seen at 29, so as to securely hold a tube 30 placed therein from any longitudinal movement when the clamping bars are tightened on the tube, and it, of course, will be understood that the recesses 22 to 27 are of different sizes to accommodate tubes of different standard outside diameters.

To do the flaring, I employ the conical compressor $30^a$, which is preferably rigidly secured to or formed integral with the threaded bolt 31 having the head 32, which is preferably perforated, as shown, and provided with the rod 33 sliding therethrough so that as much leverage as is desired can be secured by sliding the headed rod 33 through the head 32. The bolt 31 is threaded through the closed end 34 of the generally U-shaped yoke 35, which has at its open end the pair of inwardly projecting flanges 36. These flanges are separated by a distance slightly greater than the thickness of the clamping bars 11 and 12, and the depth of the yoke is such that when the compressor $30^a$ is threaded back substantially as far as it will go, it is possible to slip the yoke in place on the clamping bars after the tube has been secured therein simply by turning the yoke to a position at right angles to that shown in Figs. 1 and 3 relative to the clamping bars, and then passing the yoke horizontally over the clamping bars until one of them is engaged by the point of the compressor. The yoke can then be turned through an angle of ninety degrees and slid along the clamping bars until the compressor is over the end of the tube to be flared. The lever handle 33 is then turned down until the compressor engages the end of the tube to be flared, and as it thus engages the tube, the flanges 36 are brought up against the under side of the clamping bars and a clamping action is secured which insures the end of the tube being completely flared between the conical end of the compressor $30^a$ and the co-operating flared portion 28 with which the tube co-operates.

It will be readily understood that with this construction of the tool, in which the yoke and the flaring tool proper can be readily removed from the clamping bars, it is possible to operate this flaring tool in any possible position of the tube, which is highly desirable, as in automobile connections it is frequently necessary to flare the end of the tube where it is already in place in positions which are not readily accessible.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a device of the class described, the combination with a pair of clamping bars having a plurality of registering semicircular recesses of different diameters in their opposed faces, of threaded separable connections for the adjacent ends of the bars which permit them to be separated for the insertion of tubes between co-operating recesses and to be clamped together to secure immovably the tubes so inserted, and a yoke having a flaring member threaded therein and movable along the clamping bars so that when the yoke is moved to bring the flaring member in registration with the selected recess and the flaring member is turned to flare the end of the tube secured therein, the yoke will be clamped to the clamping bars.

2. In a device of the class described, the combination with a pair of clamping bars having a plurality of registering semicircular recesses of different diameters in their opposed faces, of threaded separable connections for the adjacent ends of the bars which permit them to be separated for the insertion of tubes between co-operating recesses and to be clamped together to secure immovably the tubes so inserted, said separable connections at one end consisting of a bolt pivoted in a slot in the end of one clamping bar and swingable into and out of a registering slot in the adjacent end of the other clamping bar, and a nut on the bolt to engage the bar to which it is not pivoted, and a yoke having a flaring member threaded therein and movable along the clamping bars so that when the yoke is moved to bring the flaring member in registration with the selected recesses and the flaring member is turned to flare the end of the tube secured therein, the yoke will be clamped to the clamping bars.

3. In a device of the class described, the combination with a pair of clamping bars having a plurality of registering semicircular recesses of different diameters in their opposed faces, of threaded separable connections for the adjacent ends of the bars which permit them to be separated for the insertion of tubes between co-operating recesses and to be clamped together to secure immovably the tubes so inserted, said separable connections at one end consisting of a screw threaded through one clamping bar and having some play in an elongated closed slot in the other clamping bar through which it passes, and a yoke having a flaring member threaded therein and movable along the clamping bars so that when the yoke is moved to bring the flaring member in registration with the selected recesses and the flaring member is turned to flare the end of the tube secured therein, the yoke will be clamped to the clamping bars.

4. In a device of the class described, the combination with a pair of clamping bars having a plurality of registering semicircular recesses of different diameters in their opposed faces, of threaded separable connections for the adjacent ends of the bars which permit them to be separated for the insertion of tubes between co-operating recesses and to be clamped together to secure immovably the tubes so inserted, said separable connections at one end consisting of a bolt pivoted in a slot in the end of one clamping bar and swingable into and out of a registering slot in the adjacent end of the other clamping bar and a nut on the bolt to engage the bar to which it is not pivoted, said separable connections at one end consisting of a screw threaded through one clamping bar and having some play in an elongated closed slot in the other clamping bar through which it passes, and a yoke having a flaring member threaded therein and movable along the clamping bars so that when the yoke is moved to bring the flaring member in registration with the selected recesses and the flaring member is turned to flare the end of the tube secured therein, the yoke will be clamped to the clamping bars.

5. In a device of the class described, the combination with a pair of clamping bars having a plurality of registering semicircular recesses of different diameters in their opposed faces, of threaded separable connections for the adjacent ends of the bars which permit them to be separated for the insertion of tubes between co-operating recesses and to be clamped together to secure immovably the tubes so inserted, and a yoke having a flaring member threaded therein and movable along the clamping bars so that when the yoke is moved to bring the flaring member in registration with the selected recesses and the flaring member is turned to flare the end of the tube secured therein, the yoke will be clamped to the clamping bars, said yoke having inwardly projecting flanges at its open end adapted to engage the under sides of the clamping bars.

6. In a device of the class described, the combination with a pair of clamping bars having a plurality of registering semicircular recesses of different diameters in their opposed faces, of threaded separable connections for the adjacent ends of the bars which permit them to be separated for the insertion of tubes between co-operating recesses and to be clamped together to secure immovably the tubes so inserted, and a yoke having a flaring member threaded therein and movable along the clamping bars so that when the yoke is moved to bring the flaring member in registration with the selected recesses and the flaring member is turned to flare the end of the tube secured therein the yoke will be clamped to the clamping bars, said yoke having inwardly projecting flanges at its open end adapted to engage the under sides of the clamping bars and having the adjacent ends of the flanges separated by a distance greater than the thickness of the clamping bars so it can be applied directly around the clamping bars.

7. In a device of the class described, the combination with a pair of clamping bars having a plurality of registering semicircular recesses of different diameters in their opposed faces, of threaded separable connections for the adjacent ends of the bars which permit them to be separated for the insertion of tubes between co-operating recesses and to be clamped together to secure immovably the tubes so inserted, said separable connections at one end consisting of a bolt pivoted in a slot in the end of one clamping bar and swingable into and out of a registering slot in the adjacent end of the other clamping bar and a nut on the bolt to engage the bar to which it is not pivoted, said separable connections at one end consisting of a screw threaded through one clamping bar and having some play in an elongated closed slot in the other clamping bar through which it passes, and a yoke having a flaring member threaded therein and movable along the clamping bars so that when the yoke is moved to bring the flaring member in registration with the selected recesses and the flaring member is turned to flare the end of the tube secured therein the yoke will be clamped to the clamping bars, said yoke having inwardly projecting flanges at its open end adapted to engage the under sides of the clamping bars and having the adjacent ends of the flanges separated by a distance greater than the thickness of the clamping bars so it can be applied directly around the clamping bars.

8. A tube flaring tool comprising a pair of clamping members separably connected together at one end thereof, abutting surfaces provided on said clamping members, said members having semicircular grooves provided therein at said abutting surfaces of providing cylindrical openings when said members are in abutting position, said grooves being beveled outwardly at their upper ends so as to enlarge the same, said grooves being provided for receiving tubes therein of various sizes, means for holding said clamping members in abutting position, a generally rectangular frame slidably mounted upon said clamping members adapted to be moved over the grooves provided for in said members, a bar threaded in said frame, means for rotating said bar for feeding the same towards or away from said cylindrical openings, and a tapered surface on the lower end of said bar for engaging into a tube received in a pair of the semicircular grooves for flaring the end of said tube outwardly in engagement with the outwardly beveled portions of said semicircular grooves.

9. A tube flaring tool comprising a pair of clamping members separably connected together, abutting surfaces provided on said members, said members having semicircular grooves provided therein at said abutting surfaces for providing cylindrical openings when said members are in abutting position, said grooves having the surfaces thereof screw-threaded for slightly biting into a tube position in said grooves in order to hold said tube against outward movement, means for holding said members in abutting position, a frame mounted upon said members, and a bar threaded in said frame and being adapted to be moved downwardly and into the tube received in said semicircular grooves for flaring said tube.

10. A tube flaring tool comprising a clamping member having a series of tube receiving openings of various sizes therein, a frame slidably arranged on said clamping member adapted to be moved over said openings, and a screw-threaded member carried by said frame and engageable into the end of a tube held by said clamping member for flaring the tube.

In witness whereof, I have hereunto set my hand this 12th day of April, 1927.

AUGUST C. DOBRICK.